Figure 1:
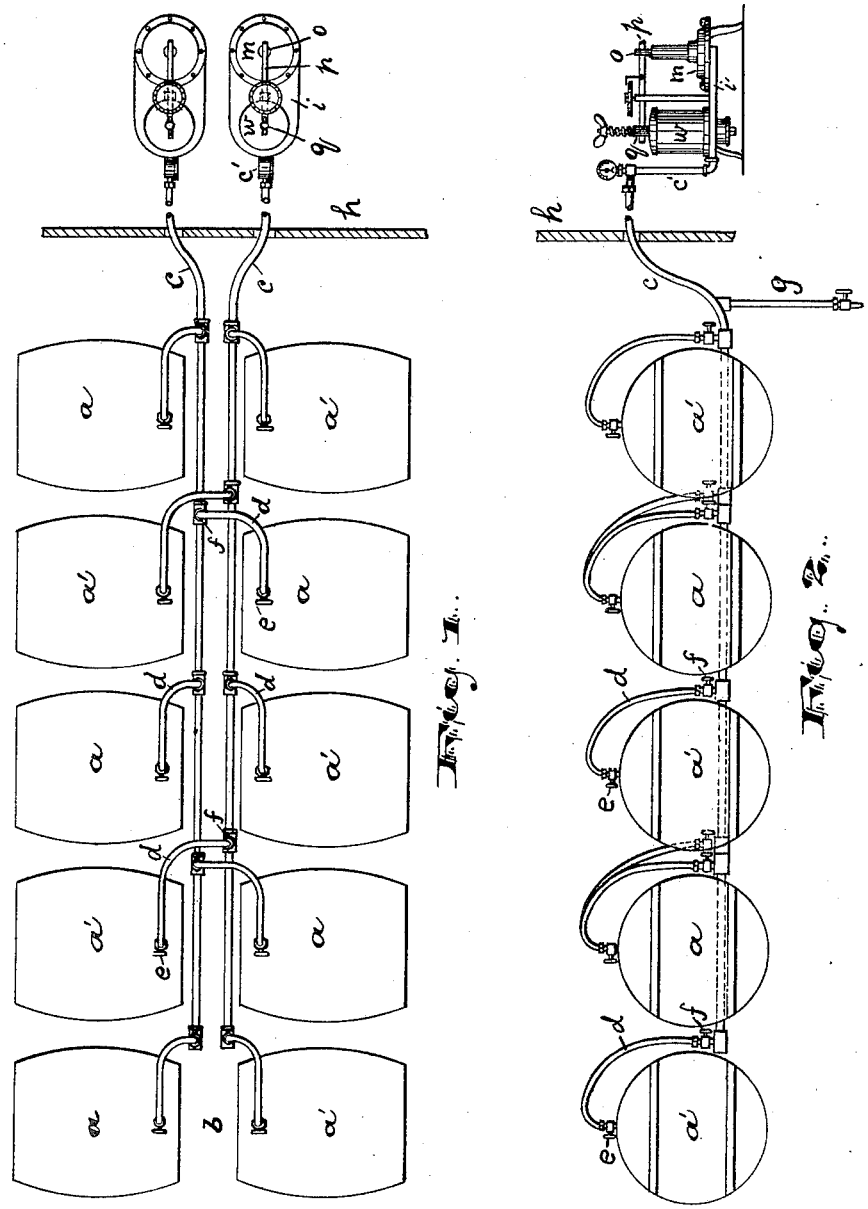

No. 630,160. Patented Aug. 1, 1899.
J. H. AYASSE.
PRESSURE APPARATUS FOR STORED FERMENTED LIQUIDS.
(Application filed Jan. 13, 1898.)
(No Model.) 3 Sheets—Sheet 1.

WITNESSES:
A. R. Krousse.
Russell M. Everett

INVENTOR
John Henry Ayasse,
BY Drake
ATTORNEYS

No. 630,160. Patented Aug. 1, 1899.
J. H. AYASSE.
PRESSURE APPARATUS FOR STORED FERMENTED LIQUIDS.
(Application filed Jan. 13, 1898.)
(No Model.) 3 Sheets—Sheet 2.
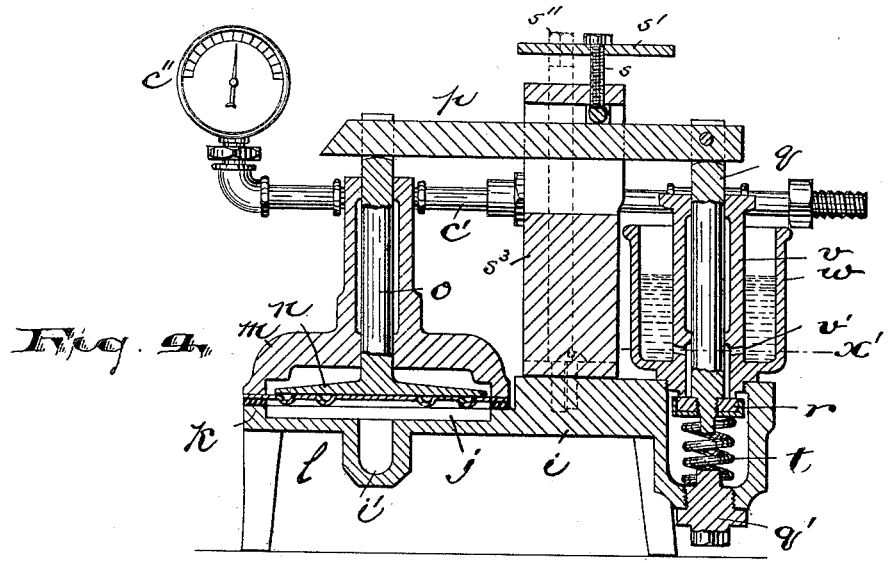
Fig. 2.
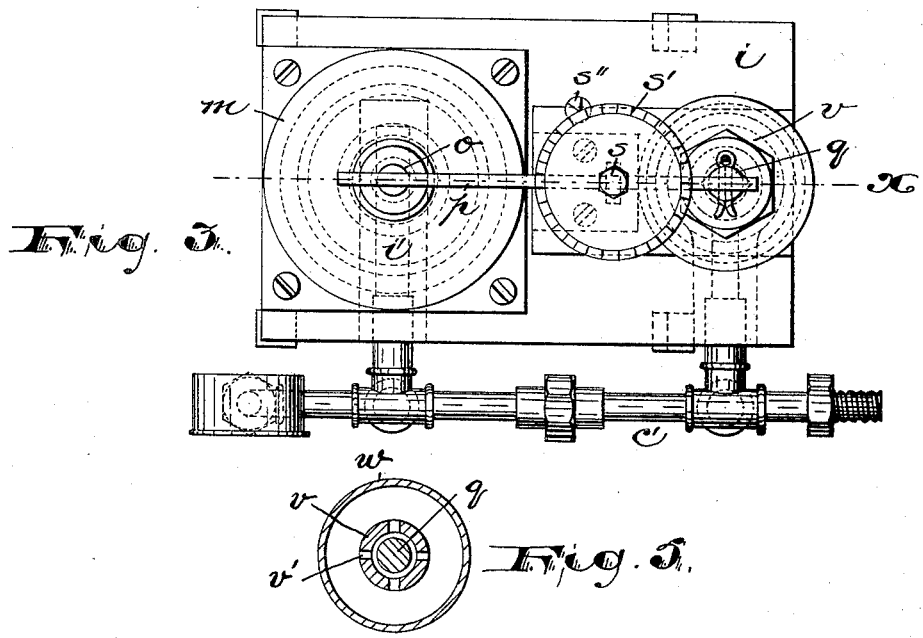
Fig. 3.
Fig. 5.
WITNESSES:
A. R. Krousse
Russell M. Everett
INVENTOR
John Henry Ayasse,
BY Drake
ATTORNEYS No. 630,160. Patented Aug. 1, 1899.
J. H. AYASSE.
PRESSURE APPARATUS FOR STORED FERMENTED LIQUIDS.
(Application filed Jan. 13, 1898.)
(No Model.) 3 Sheets—Sheet 3.
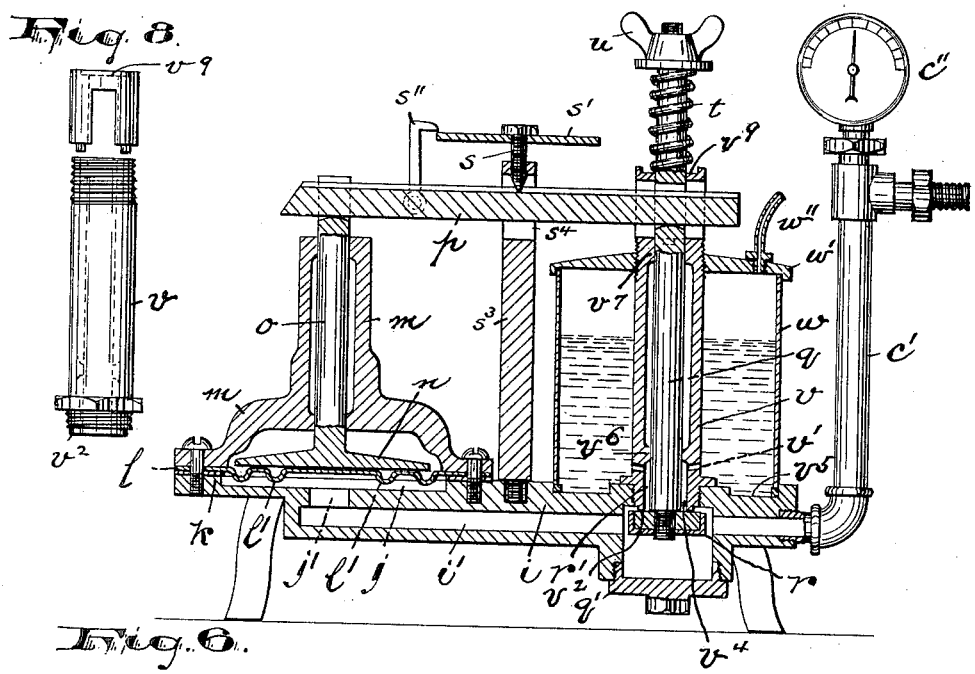
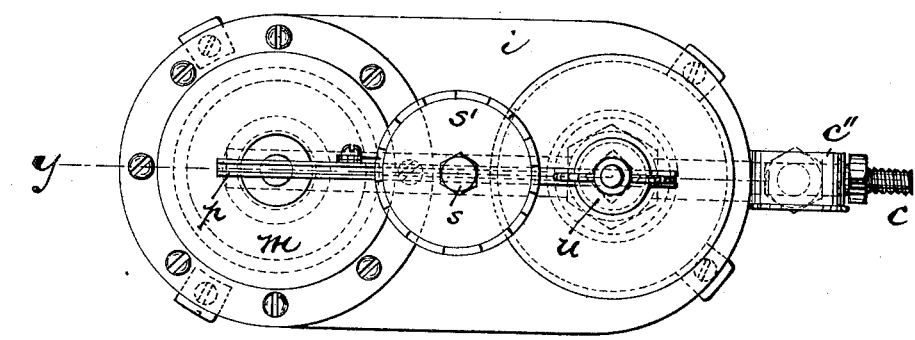
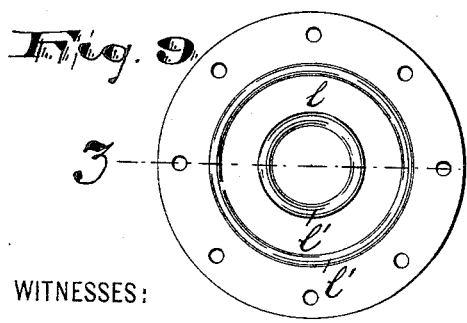
WITNESSES:
A. R. Krause.
Russell M. Everett
INVENTOR
John Henry Ayasse,
BY Draker &
ATTORNEYS

UNITED STATES PATENT OFFICE.

JOHN HENRY AYASSE, OF NEWARK, NEW JERSEY.

PRESSURE APPARATUS FOR STORED FERMENTED LIQUIDS.

SPECIFICATION forming part of Letters Patent No. 630,160, dated August 1, 1899.

Application filed January 13, 1898. Serial No. 666,539. (No model.)

*To all whom it may concern:*

Be it known that I, JOHN HENRY AYASSE, a citizen of the United States, residing at Newark, in the county of Essex and State of New Jersey, have invented certain new and useful Improvements in Pressure Apparatus for Stored Fermented Liquids and Regulating Devices Therefor; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

The objects of this invention are to reduce the cost of maintaining the fermenting liquid within storage-casks of a brewery at a regular and even degree of compression, to prevent undue compression and the danger caused thereby of the cask containing the fermenting liquid bursting and being thus rendered worthless and the contents wasted, to regulate the compression with greater convenience and ease, to maintain a series of casks at a uniform and even degree of compression, and to secure other advantages and results, some of which may be referred to hereinafter in connection with the description of the working parts:

The invention consists in the improved pressure-regulating device for casks containing fluid, more particularly beer or other fermented liquor, and especially those casks which are used for storing the liquid preliminary to racking off into bottles or kegs, and in the arrangements and combinations of parts of the same, all substantially as will be hereinafter set forth, and finally embraced in the claim.

Referring to the accompanying drawings, in which like letters and figures of reference indicate corresponding parts in each of the views, Figure 1 is a plan showing the arrangement of my improved system of devices by means of which the casks of one or more series are brought into connection with one another and with a common regulating device. Fig. 2 is a front elevation of the same. Fig. 3 is a plan of my improved regulating device. Fig. 4 is a section of the same, taken at line $x$, Fig. 3. Fig. 5 is a detail section taken at line $x'$, Fig. 4. Fig. 6 is a section showing a modified and a sometimes preferred construction of my improvements, the section being taken on line $y$, Fig. 7. Fig. 7 is a plan of said modified construction. Fig. 8 is a detail side elevation of a certain valve-rod-supporting tube and its cap. Fig. 9 is a plan of a certain resilient sheet-metal diaphragm employed in connection with the regulating device; and Fig. 10 is a sectional view of said diaphragm, taken at line $z$, Fig. 9.

In said drawings, $a\ a\ a\ a'\ a'\ a'$ illustrate two series of casks, which casks in practice are adapted to contain one hundred and twenty-five barrels of fluid, more or less, each. These casks ordinarily are arranged in opposite sides of a passage-way $b$ and are provided with the ordinary means whereby the liquid may be racked off from time to time and the casks replenished with new fluid. Ordinarily it is the practice to fill said casks once every one or two months, more or less, the fluid while stored in the said casks undergoing a fermenting process, whereby its flavor is improved, and giving off a certain amount of carbonic acid generated during fermentation. To prevent this gas from accumulating in said casks and producing a very high compression, such as would soon burst the casks if not allowed to escape, it has been the common practice to supply each cask with a regulating device, by means of which a limited escape was permitted and certain normal pressure was maintained. The compression ordinarily preferred was about from five to seven pounds above the normal atmospheric pressure. The devices heretofore employed have frequently as constructed become obstructed in the movements of their parts and have required frequent attention or examination to ascertain whether or not they were in proper operative condition to prevent explosion. This required much labor and trouble in testing the casks and ascertaining the pressure within. With these objects in view I employ longitudinal or main pipes $c\ c$, extending along the series of casks $a\ a'$, which pipes are formed, preferably of metal, and are provided with a series of branch pipes $d$ of flexible material, such as rubber or the like. These branch pipes are properly fitted to the main pipe and extend therefrom to the top of the casks.

They are provided with suitable valves $ef$ at the points of connection with the casks and main pipes, by means of which valves the flow of gas may be cut off both at the cask and at the pipes, the said valves being formed independent of the branches, so as to permit of the removal of the said branch pipes, either or both, from the vent-cask connections and the main-pipe connections without interfering with the pressure in the other casks, and the substitution of the usual hose or pipes for racking off the fluid. I prefer to employ also in connection with the main pipe a drain-pipe $g$, by means of which the beer or fluid of the casks entering the main pipe is drained from time to time to prevent the said fluid from passing into the regulating device. In connection with said main pipes $c$ I employ the improved regulating devices, which latter are preferably seated in a different compartment from the series of casks, as indicated in Figs. 1 and 2, $h$ indicating a partition separating the cask-rooms, which are usually dark and damp, from the room containing said regulating devices, the separate apartment from that containing the casks being dry and convenient for frequent observation of the device.

I prefer to arrange the casks alternately, as indicated in Fig. 1, where two series of casks are shown, each series having casks alternately arranged on opposite sides of the passage $b$, so that casks having differently-compressed contents will be convenient of access in certain operations. The several casks on each main pipe under ordinary conditions have open connection one with another, and thus the contents of said casks are maintained at a uniform pressure.

The peculiar regulating device which I prefer to employ comprises a bed-casting $i$, having at or near one end thereof, on the upper side, a round recess $j$, with a raised seat $k$ therearound, on which is arranged a metallic diaphragm $l$, having annular concentric corrugations $l'$, by means of which said diaphragm is flexed when fastened on its seat. Above said diaphragm $l$, which is disposed horizontally over the recess or chamber $j$, so that liquid condensations may drain entirely away therefrom, is a cap $m$, which is chambered so as to receive a disk-like plate $n$, seated upon said diaphragm and adapted to be moved vertically thereby as said diaphragm is flexed under the varying compression of the gas. The cap $m$ is provided on its upper side with a tubular extension $m'$, and the said disk $n$ is provided also at its back or upper side with a rod $o$, the upper end of which projects through said extension and is recessed or forked. Between the prongs of said fork a lever $p$ for operating the valve-rod $q$ is arranged. Said rod $q$ is disposed or lies parallel with the rod $o$ and is in connection with the valve $r$ for controlling the gas-escape passage $r'$ for the compressed gas within the casks and connections. By opening or closing the said valve $r$ to a greater or less degree the generated gas is allowed to escape with greater or less rapidity, an increase of pressure opening said valve and a reduction of pressure effecting a closure of the same, so as to maintain within the casks a uniform normal pressure. Said lever $p$ is fulcrumed at about its center upon an adjusting-screw $s$, by means of which the position of the fulcrum can be varied at will. Said adjusting-screw is arranged on a stud $s^3$, fixed to the bed-plate at a point between the recess $j$ and the valve 20 and extending up from said bed-plate to a point approximately in horizontal line with the rods $o$ and $q$, where it is horizontally perforated, as at $s^4$, to receive the lever and vertically perforated and threaded to receive the fulcrumal screw $s$, which latter is seated in the threaded perforation above the lever, so that the latter will bear thereon when pressed upward. At its opposite end from the rod $o$ the said lever $p$ engages the valve-rod $q$ and coöperates with a spring $t$ on said rod $q$ to maintain automatically the desired compression. Said spring can be increased or diminished in tension by means of an adjusting thumb-nut $u$ and acts normally to hold the air-escape valve closed. The said lever extends through said valve-rod, as shown, and when lifted at one end by the diaphragm $l$ and connections it is depressed at the opposite end and throws the air-escape valve $r$ open to permit a more free outflow of the compressed air. This said valve may be set at any desired pressure. For example, under ordinary circumstances I prefer to set the said valve at seven and one-half pounds. The said valve-rod is preferably arranged in bearings within a vertical tube $v$, fixed to the bed-plate, the said tube being provided with male threads to enter a vertical opening in the bed-plate having corresponding threads. A little above its threaded lower end the said tube is furnished with openings $v'$ for the outpassage of gas from the open valve. The lower extremity of the tube serves as a valve-seat $v^2$, against which the valve $r$ is forced up by the spring $t$.

Within the tube $v$, above the passage $v^4$ therein for the outflowing gas, are suitable bearings $v^6 v^7$, on which the valve-rod $q$ slides, the said bearings projecting a little in from the side walls of the tube to reduce friction. At the upper end of the tube the same is provided with a horizontal opening $v^8$ to receive the lever $p$ or permit the passage of the same, and at its upper extremity, above said horizontal opening, it provides a seat $v^9$, upon which the exposed spring $t$ for automatically closing the valve bears with greater or less pressure, governed by the regulating-nut $u$, as will be understood. Around said tube is arranged a water-cup $w$, which may be of glass, so as to permit a view of the escaping gas as it bubbles up through the water. The top of said water-cup is preferably inclosed by a cap $w'$, in which is arranged a gas-escape passage, such as is provided by the pipe or tube $w''$, of any desirable construction. This cap $w'$ prevents the water from spattering out of the cup as the gas bubbles rise through the water and break and also prevents the settling of dust or dirt in said cup. To receive the transparent cylindrical part of the cup, the top of the bed-plate is provided with a recess $v^5$, into which said transparent part fits, the joint being rendered impervious in any desirable manner.

Within the bed-plate $i$ is formed a compressed-air passage $i'$, which is disposed horizontally and is in open communication with the recess $j$ through the passage $j'$ and with the valve-opening and at the end of the bed-plate is in open connection with a pipe $c'$, leading to or adapted to be brought into connection with the main pipe $c$, above referred to. On this pipe $c'$ I arrange a pressure indicator or gage $c''$ of any construction adapted to reveal the pressure of the gas within the cask or main pipe at any time.

The adjusting-screw $s$, serving as a fulcrum for the lever, is provided above the end of the stud $s^3$ with a dial or disk $s'$, on which are graduation-marks indicating the degree of movement necessary in making a proper setting of the lever. This dial-plate operates, in connection with an index hand or pointer $s''$, to facilitate the setting operation.

The bed-plate, at a point in line with the valve-rod $q$, is open on the under side and is provided with a screw plug or cap $q'$, adapted to be removed to permit of the easy and quick removal of said valve from its rod and seat for purposes of repair and renewal without changing the fulcrumal adjusting-screw or the tension of the spring.

In a prior construction sometimes employed heretofore the single main pipe connecting the several barrels of a series was elevated considerably above the casks and the branch pipes depended therefrom, so that the fluid condensations within said pipes, after lying in said pipes and taking up metallic salts or the like, have been allowed to run back into the casks, thus contaminating and injuring the quality of the beer therein. In my improved construction the connecting-pipe $c$ is disposed horizontally in a plane below the top of the barrels, the branch pipes leading down from the top of the barrel or cask to the said connecting-pipe to secure a downward flow of the condensed fluids from the barrels to a suitable outlet, thus preventing the return flow of the condensed fluid into the barrels. Furthermore, by having the connection-pipes near the bottom of the barrels I obtain more convenient access to the main-pipe connections, whereby I am enabled to change the said connections with great facility and ease, as will be hereinafter explained. Again, I am aware that heretofore safety-valves have been provided employing rubber disks; but such rubber disks were objectionable, as above intimated, requiring frequent examination to ascertain whether or not they were in proper operative condition. Inasmuch as the rubber has a peculiar affinity for the ingredients of the beer or the gaseous and vaporous effluvia therefrom, the fluid condensations tend to prevent a free action of said disk unless frequently cleaned, so that the valve fails to maintain a true indication of the pressure in the casks. In the present construction I have dispensed with the use of the rubber and secured a more certain, positive, and uniform result by the metallic construction herein described. Further advantageous results are obtained from my construction by disposing the valve-spring $t$ outside of the fluid chambers or ducts, where gummy matter or sediment is prevented from making a deposit thereon, and thus clogging its operations, so that the valve is not properly sensitive to variations. In my construction the spring $t$, governing the valve, is not inclosed where it can contact with the moist gas from the cask or with the water in the cup $w$ or with the wash-water so freely directed upon the casks, &c., in the operation of cleaning. Indeed, the spring, with the device, is in a separate room or apartment, where it or the regulating device is not subjected to water from the cleaning-hose; but if the regulating device were placed upon the casks the exposed spring would not be clogged, but only cleaned, by the water, which would immediately drain off and the spring soon dry. Again, I employ means for securing a more exact working of the valve by providing an index device in connection with the fulcrum of the valve-lever. I thus avoid the necessity for turning the bearings of the valve-spring, as in other devices for the purpose, and disturbing the adjustment of said spring, it being understood that the pressure required is exact, and any arrangement of parts tends to disturb the adjustment of the regulating device, so that its indications become untrue and misleading and the pressures vary from the proper standard indicated.

Having thus described the invention, what I claim as new is—

The improved pressure-regulating devices for brewers' casks comprising a bed-plate having a chamber, passage, and a valve-tube bearing at one side of said chamber, a corrugated sheet-metal diaphragm arranged horizontally over the chamber in said bed-plate, a chambered cap resting at its edges on said diaphragm and secured to said bed-plate and having a tubular upward extension, a disk lying in said hollow cap, above said metal diaphragm and having a rod, $o$, extending therefrom through the tubular extension and projecting out from said extension, the projecting end being recessed or forked and engaging a lever, said lever fulcrumed on an adjustable screw arranged above said lever and having a dial-plate with indicating-marks, a stud secured to the bed-plate and providing a passage for the lever and a bearing for the adjustable fulcrum above said lever, a valve-rod $q$, operated by the lever, a valve engaging a valve-seat within the bed-plate, a spring $t$, arranged outside of the chambered bed-plate on the valve-rod, a tube $v$, arranged in the tube-bearings of the bed-plate around said valve-rod and providing a valve-seat at its lower end, a lever-passage and spring-bearing at its upper end and furnished with openings for the outflow of gas between said ends, and a transparent water-cup seated on the bed-plate outside of said tube whereby the gas issuing from the openings in said tube will appear to view as it bubbles up from said openings, and a nut $u$, for increasing or diminishing the tension of the spring, substantially as set forth.

In testimony that I claim the foregoing I have hereunto set my hand this 7th day of January, 1897.

JOHN HENRY AYASSE.

Witnesses:
RUSSELL M. EVERETT,
C. B. PITNEY.